(12) United States Patent
Peach et al.

(10) Patent No.: US 7,768,406 B1
(45) Date of Patent: Aug. 3, 2010

(54) RFID TAG CIRCUIT RECTIFIER WITH CONTROLLED BACKFLOW REDUCTION

(75) Inventors: Charles J. T. Peach, Seattle, WA (US); John D. Hyde, Corvallis, OR (US)

(73) Assignee: Impinj, Inc., Seattle, WA (US)

( * ) Notice: Subject to any disclaimer, the term of this patent is extended or adjusted under 35 U.S.C. 154(b) by 239 days.

(21) Appl. No.: 12/145,284

(22) Filed: Jun. 24, 2008

(51) Int. Cl.
*G08B 13/14* (2006.01)

(52) U.S. Cl. ............... 340/572.7; 340/572.8; 340/645; 235/380

(58) Field of Classification Search .............. 340/572.7, 340/527.8, 505, 513, 645; 343/741, 866; 361/54, 56; 235/375, 380, 487, 492
See application file for complete search history.

(56) References Cited

U.S. PATENT DOCUMENTS

| 7,167,090 | B1 | 1/2007 | Mandal et al. |
| 2005/0130389 | A1* | 6/2005 | Yamazaki et al. ............ 438/455 |
| 2008/0080214 | A1* | 4/2008 | Umeda et al. ................. 363/37 |

* cited by examiner

*Primary Examiner*—Hung T. Nguyen
(74) *Attorney, Agent, or Firm*—Turk IP Law, LLC

(57) ABSTRACT

The present disclosure provides a power rectifier for a Radio Frequency Identification tag circuit. The power rectifier can be constructed from serially coupled rectifier stages. One of the rectifier stages includes a backflow reduction device or a bias preservation circuit, or both, at least one of which us controlled by a signal derived from a control signal source of the tag circuit.

23 Claims, 12 Drawing Sheets

*POWER RECTIFIER FOR RFID TAG WITH BACKFLOW REDUCTION*

*RFID TAG COMPONENTS*

*POWER RECTIFIER AS PART
OF POWER MANAGEMENT UNIT*

POWER RECTIFIER FOR RFID TAG
WITH BACKFLOW REDUCTION

*RF RECTIFIER STAGE WITH BIAS PRESERVATION*

*RF RECTIFIER STAGE WITH BACKFLOW REDUCTION AND BIAS PRESERVATION*

**CMOS RF RECTIFIER STAGE WITH
BACKFLOW REDUCTION AND BIAS PRESERVATION**

CONTROL SIGNALS
DERIVED FROM MODULATOR

CONTROL SIGNALS
DERIVED FROM DEMODULATOR

RFID TAG CIRCUIT RECTIFIER WITH CONTROLLED BACKFLOW REDUCTION

CROSS-REFERENCE TO RELATED APPLICATION(S)

This patent application may be found to be pertinent to commonly owned U.S. patent application Ser. No. 12/042,141 filed on Mar. 4, 2008, and entitled "RFID TAG WITH DOUBLE-SWITCH RECTIFIER".

This patent application may be found to be pertinent to commonly owned U.S. patent application Ser. No. 12/042,117 filed on Mar. 4, 2008, and entitled "RFID TAGS WITH SYNCHRONOUS POWER RECTIFIER".

BACKGROUND

Radio Frequency IDentification (RFID) systems typically include RFID tags and RFID readers. RFID readers are also known as RFID reader/writers or RFID interrogators. RFID systems can be used in many ways for locating and identifying objects to which the tags are attached. RFID systems are particularly useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be magnetic in the near field.

A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna system, a radio section, a power management section, and frequently a logical section, a memory, or both. In earlier RFID tags, the power management section included an energy storage device, such as a battery. RFID tags with an energy storage device are known as active or semi-active tags. Advances in semiconductor technology have miniaturized the electronics so much that an RFID tag can be powered solely by the RF signal it receives. Such RFID tags do not include an energy storage device, and are called passive tags.

Harvesting sufficient power from the RF wave can be difficult since the voltage of the RF signal is in the range of approximately 200 mV, and a typical supply voltage for circuits of the RFID tag is 1 V. Available RF signal amplitude is insufficient to operate the RFID tag, therefore power rectifier circuits typically use charge-pumps to increase the output DC voltage.

Additionally, for relatively high-voltage operations, such as programming and erasing non-volatile memory in the RFID tag, a boosted voltage as high as 12 V may be needed. Complicating matters is that the RF wave received by the RFID tag is not provided constantly, and can cease to be transmitted by the RFID reader without any notice. Additionally when the RFID tag backscatters it stops harvesting energy, causing yet another interruption in voltage generation.

Thus, the operation of the passive RFID tag converting the low-level RF waveform to a usable voltage requires a rectifier circuit that can maximize the use of available radiation energy, and generate usable voltage quickly and efficiently.

BRIEF DESCRIPTION OF THE DRAWINGS

The following Detailed Description proceeds with reference to the accompanying Drawings.

DETAILED DESCRIPTION

Figure 1:
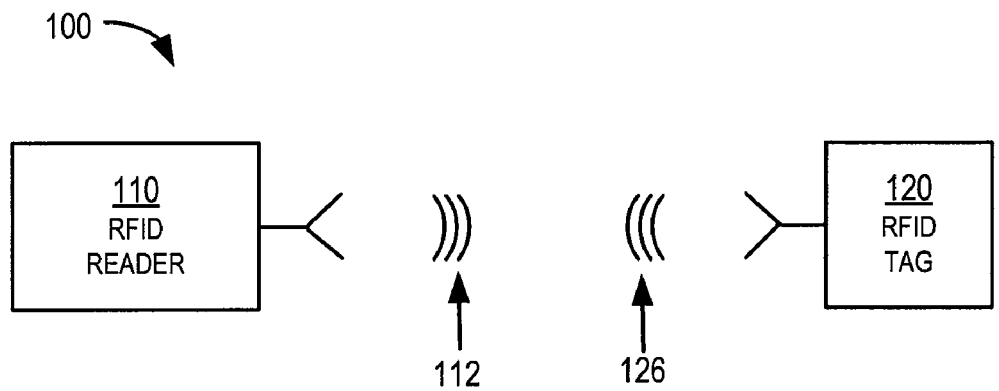
FIG. 1 is a block diagram of an RFID system.

The present invention is now described in more detail. While it is disclosed in its preferred form, the specific embodiments of the invention as disclosed herein and illustrated in the drawings are not to be considered in a limiting sense. Rather, these embodiments are provided so that this disclosure will be thorough and complete, and will fully convey the scope of the invention to those skilled in the art. Indeed, it should be readily apparent in view of the present description that the invention might be modified in numerous ways. Among other things, the present invention may be embodied as devices, methods, and so on. Accordingly, the present invention may take the form of an entirely device embodiment, an entirely method embodiment, or an embodiment combining aspects of the above. This description is therefore, not to be taken in a limiting sense.

FIG. 1 is a diagram of components of a typical RFID system 100, incorporating aspects of the invention. An RFID reader 110 transmits an interrogating Radio Frequency (RF) wave 112. RFID tag 120 in the vicinity of RFID reader 110 may sense interrogating RF wave 112, and generate wave 126 in response. RFID reader 110 senses and interprets wave 126.

Reader 110 and tag 120 exchange data via wave 112 and wave 126. In a session of such an exchange, each encodes, modulates, and transmits data to the other, and each receives, demodulates, and decodes data from the other. The data is modulated onto, and decoded from, RF waveforms.

Encoding the data in waveforms can be performed in a number of different ways. For example, protocols are devised to communicate in terms of symbols, also called RFID symbols. A symbol for communicating can be a delimiter, a calibration symbol, and so on. Further symbols can be implemented ultimately for exchanging binary data, such as "0" and "1", if that is desired. In turn, when the waveforms are processed internally by reader 110 and tag 120, they can be equivalently considered and treated as numbers having corresponding values, and so on.

Figure 2:
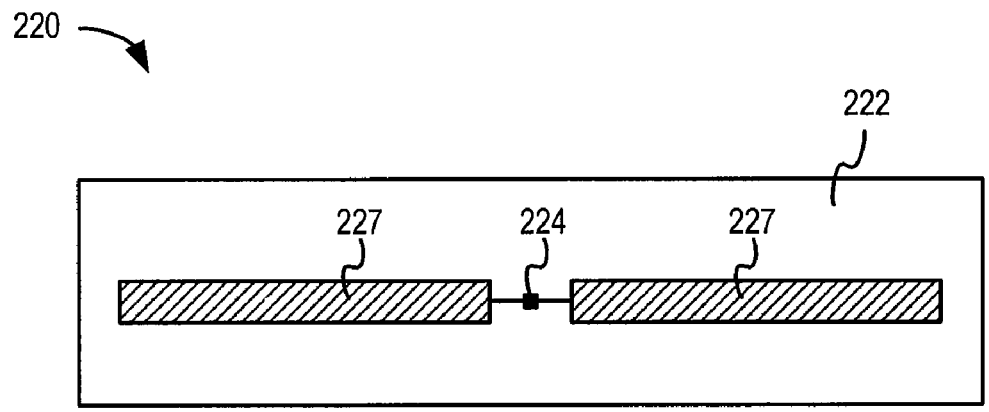
FIG. 2 is a diagram showing components of a passive RFID tag.

Tag 120 can be a passive tag or an active or semi-active tag, i.e. having its own power source. Where tag 120 is a passive tag, it is powered from wave 112. FIG. 2 is a diagram of an RFID tag 220, which can be the same as tag 120 of FIG. 1. Tag 220 is implemented as a passive tag, meaning it does not have its own power source. Much of what is described in this document, however, applies also to active tags.

Tag 220 is formed on substantially planar inlay 222, which can be made in many ways known in the art. Tag 220 includes an electrical circuit, which is preferably implemented in an integrated circuit (IC) 224. IC 224 is arranged on inlay 222.

Tag 220 also includes an antenna for exchanging wireless signals with its environment. The antenna is usually flat and attached to inlay 222. IC 224 is electrically coupled to the antenna via suitable antenna ports (not shown in FIG. 2).

The antenna may be made in a number of ways, as is well known in the art. In the example of FIG. 2, the antenna is made from two distinct antenna segments 227s, which are shown here forming a dipole. Many other embodiments are possible, using any number of antenna segments.

In some embodiments, an antenna can be made with even a single segment. Different points of the segment can be coupled to one or more of the antenna ports of IC 224. For example, the antenna can form a single loop, with its ends coupled to the ports. It should be remembered that, when the single segment has more complex shapes, even a single segment could behave like multiple segments, at the frequencies of RFID wireless communication.

In operation, a signal is received by the antenna, and communicated to IC 224. IC 224 both harvests power, and responds if appropriate, based on the incoming signal and its internal state. In order to respond by replying, IC 224 modulates the reflectance of the antenna, which generates the backscatter from a wave transmitted by the reader. Coupling together and uncoupling the antenna ports of IC 224 can modulate the reflectance, as can a variety of other means.

In the embodiment of FIG. 2, antenna segments 227 are separate from IC 224. In other embodiments, antenna segments may alternately be formed on IC 224, and so on.

The components of the RFID system of FIG. 1 may communicate with each other in any number of modes.

Figure 3:
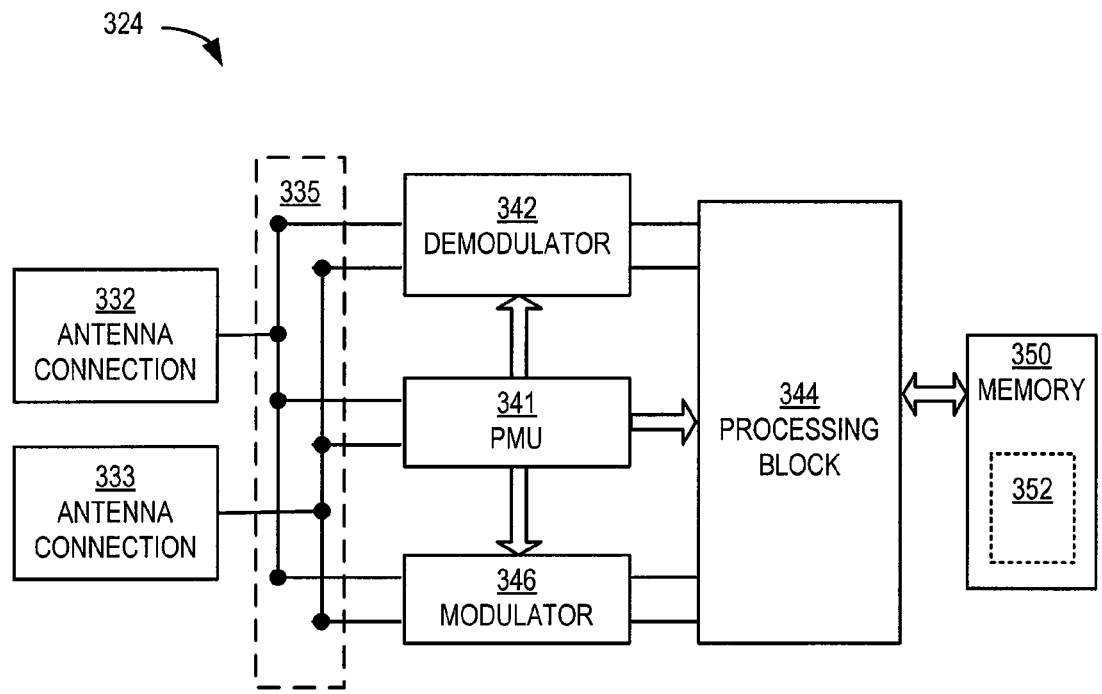
FIG. 3 is a block diagram of an implementation of an electrical circuit formed in an IC of tag of FIG. 2.

FIG. 3 is a block diagram of an electrical circuit 324. Circuit 324 may be formed on a semiconductor substrate in an IC of an RFID tag, such as IC 224 of FIG. 2. Circuit 324 has a number of main components that are described in this document. Circuit 324 may have a number of additional components from what is shown and described, or different components, depending on the exact implementation.

Circuit 324 includes at least two antenna connections 332 and 333, which are suitable for coupling to one or more antenna segments (not shown in FIG. 3). Antenna connections 332 and 333 may be made in any suitable way, such as pads and so on. In a number of embodiments, more than two antenna connections are used, especially in embodiments where more antenna segments are used.

Circuit 324 includes a section 335. Section 335 may be implemented as shown, for example as a group of nodes for proper routing of signals. In some embodiments, section 335 may be implemented other ways, for example to include a receive/transmit switch that can route a signal, and so on.

Circuit 324 also includes Power Management Unit (PMU) 341. PMU 341 may be implemented in any way known in the art, for harvesting raw RF power received via antenna connections 332, 333. In some embodiments, PMU 341 includes at least one rectifier, and so on.

In operation, an RF wave received via antenna connections 332, 333 is received by PMU 341, which in turn generates power for components of circuit 424.

Circuit 324 additionally includes a demodulator 342. Demodulator 342 demodulates an RF signal received via antenna connections 332, 333. Demodulator 342 may be implemented in any way known in the art, for example including an attenuator stage, amplifier stage, and so on.

Circuit 324 further includes processing block 344. Processing block 344 receives the demodulated signal from demodulator 342, and may perform operations. In addition, it may generate an output signal for transmission.

Processing block 344 may be implemented in any way known in the art. For example, processing block 344 may include a number of components, such as a processor, memory, a decoder, an encoder, and so on.

Circuit 324 additionally includes a modulator 346. Modulator 346 modulates an output signal generated by processing block 344. The modulated signal is transmitted by driving antenna connections 332, 333, and therefore driving the load presented by the coupled antenna segment or segments. Modulator 346 may be implemented in any way known in the art, for example including a driver stage, an amplifier stage, and so on. In one embodiment, demodulator 342 and modulator 346 may be combined in a single transceiver circuit. In another embodiment, modulator 346 may include a backscatter transmitter or an active transmitter. In yet other embodiments, demodulator 342 and modulator 346 are part of processing block 344.

Circuit 324 additionally includes a memory 350, which stores data 352. Memory 350 is preferably implemented as a Nonvolatile Memory (NVM), which means that data 352 is retained even when circuit 324 does not have power, as is frequently the case for a passive RFID tag.

It will be recognized at this juncture that the shown components of circuit 324 can be those of a circuit of an RFID reader according to the invention, with or without needing PMU 341. Indeed, an RFID reader can be powered differently, such as from a wall outlet, a battery, and so on. Additionally, when circuit 324 is configured as a reader, processing block 344 may have additional Inputs/Outputs (I/O) to a terminal, network, or other such devices or connections.

Figure 4:
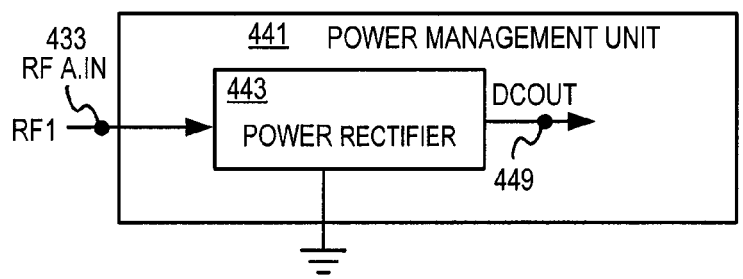
FIG. 4 is a block diagram illustrating components of a Power Management Unit (PMU) of the circuit of FIG. 3.

FIG. 4 is a block diagram that illustrates a power management unit 441, similar to that of component 341 of the circuit of FIG. 3. Power management unit 441 includes at least one power rectifier with backflow reduction 443. Power rectifier 443 is coupled to a terminal of an antenna (not shown) at input node 433 to receive RF signal RF1. Power rectifier 443 converts induced alternating current ("AC") voltage captured by the antenna segments into usable DC voltage DCOUT 449. The DC voltage can be used to power operations of RFID tag 220 of FIG. 2.

Figure 5:
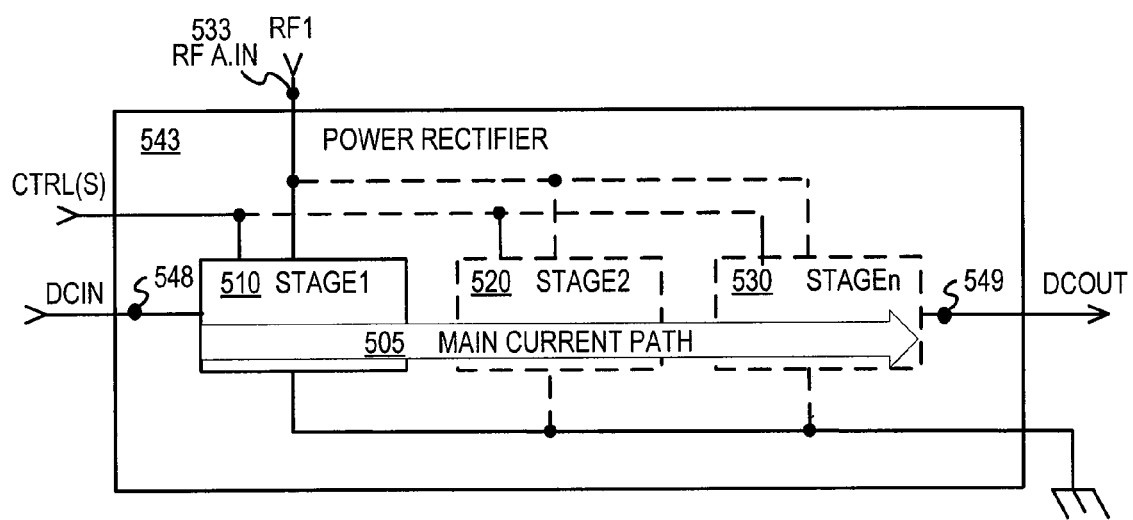
FIG. 5 is a block diagram illustrating a power rectifier with backflow control of the PMU of FIG. 4 according to an embodiment.

FIG. 5 is a block diagram that illustrates power rectifier circuit 543 for an RFID tag. Power rectifier circuit 543 includes antenna input node 533 that is configured to receive the alternating RF signal wirelessly, and a number of serially coupled rectifier stages. They are rectifier stage1 510 through rectifier stageN 530. The serially coupled rectifier stages define a main current path 505. Rectifier stage1 510 through rectifier stageN 530 are coupled to ground, while they are also coupled to antenna input node 533 to receive RF signal RF1. An input node of rectifier stage1 510 is connected to a DCIN node 548. DCIN node 548 can be implemented in any number of ways, as will be discerned by a person skilled in the art. For example, it can be the ground, or another voltage for different embodiments. Output node 549 of rectifier stageN 530 provides DC output DCOUT. At least one of the rectifier stages also receives at least one control signal. At least one of the stages includes a segment of the main current path. The rectifier segment includes at least a first rectifying device, a second rectifying device, and a backflow reduction device for substantially disconnecting and reconnecting the segment less frequently than a frequency of the alternating signal. Detailed description of a stage and a current pass segment are provided later in the text, associated with FIGS. 8A-B and 14.

Figure 6:
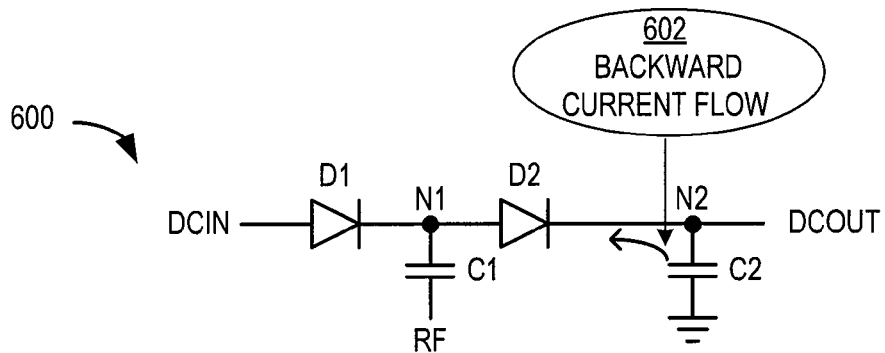
FIG. 6 is a schematic diagram of a conventional Dickson RF "Charge-pump" Stage according to prior art.

FIG. 6 illustrates Dickson RF charge-pump stage 600. Charge-pump stage 600 includes two diodes D1 and D2 that are coupled in series at node N1. Capacitor C1 is connected to node N1 to receive an RF input signal. Capacitor C2 is connected between a ground and output terminal DCOUT. During a negative half of its AC cycle, the RF input signal forward biases diode D1 and charges capacitor C1. At this time, voltage V1 at node N1 is equal to DCIN−VT1, where VT1 is a threshold voltage of diode D1. During a positive half of its AC cycle, the RF input signal reverse biases diode D1 and forward biases diode D2. At this time voltage V1 at node N1 is equal to DCIN−VT1+2*VA, where a value of the RF input signal is given by VA*sin(ωt). Because diode D2 is forward biased, it transfers charge from capacitor C1 to capacitor C2, and voltage V2 at node DCOUT is equal to DCIN−VT1+2*VA−VT2, where VT2 is a threshold voltage of diode D2.

Note 602 indicates that current can flow off the rectifier's output, back into the rectifier, when RF is low during a modulation phase, which is also known as a signaling pulse. Briefly, an example of this modulation phase is seen as ΔT2 in FIG. 16. The magnitude of this current flow depends on the characteristics of diode D2. Minimizing this current flow can improve the efficiency of the rectifier stage.

Figure 7:
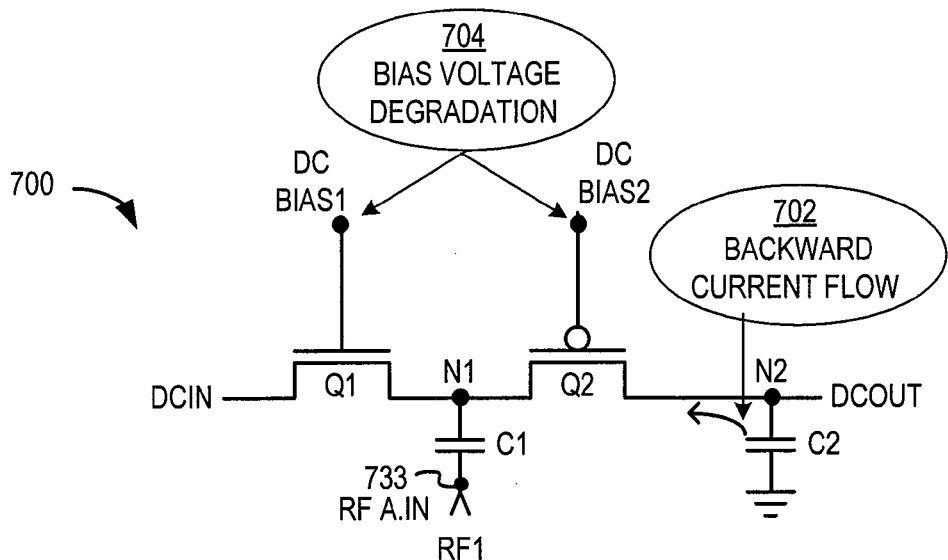
FIG. 7 is a schematic diagram of a conventional CMOS RF rectifier stage according to prior art.

FIG. 7 is a schematic diagram of a conventional CMOS RF rectifier stage 700. Rectifier stage 700 includes a pair of CMOS switching transistors Q1 and Q2. Voltage biases are coupled to gates of transistors Q1 and Q2 to provide bias voltages thereto. nFET Q1 and pFET Q2 are coupled in series at node N1. Capacitor C1 is connected between node N1 and RF antenna input node 733. Capacitor C2 is connected between ground and output terminal DCOUT.

When a gate bias voltage of nFET Q1 is greater than or equal to DCIN+VT1, where VT1 is a threshold voltage of transistor Q1, and the RF1 input signal is in the negative half of its AC cycle, nFET Q1 turns ON and voltage V1 at node N1 is equal to DCIN. During this time, nFET Q2 is OFF. When the voltage level of the RF input signal increases from −VA to +VA, nFET Q1 turns OFF and nFET Q2 is turned ON. While nFET Q2 is ON, it transfers charge from capacitor C1 to capacitor C2, and voltage level V2 at node DCOUT is equal to DCIN+2*VA.

Note 702 indicates that current can flow off the rectifier's output back into the rectifier when RF is low during a modulation phase. The magnitude of the current flow depends on characteristics of pFET Q2 and nFET Q1. Minimizing this current flow can improve the efficiency of the rectifier stage.

Note 704 indicates that a degradation of bias voltages can occur when RF1 is low during a modulation phase.

Figure 8A:
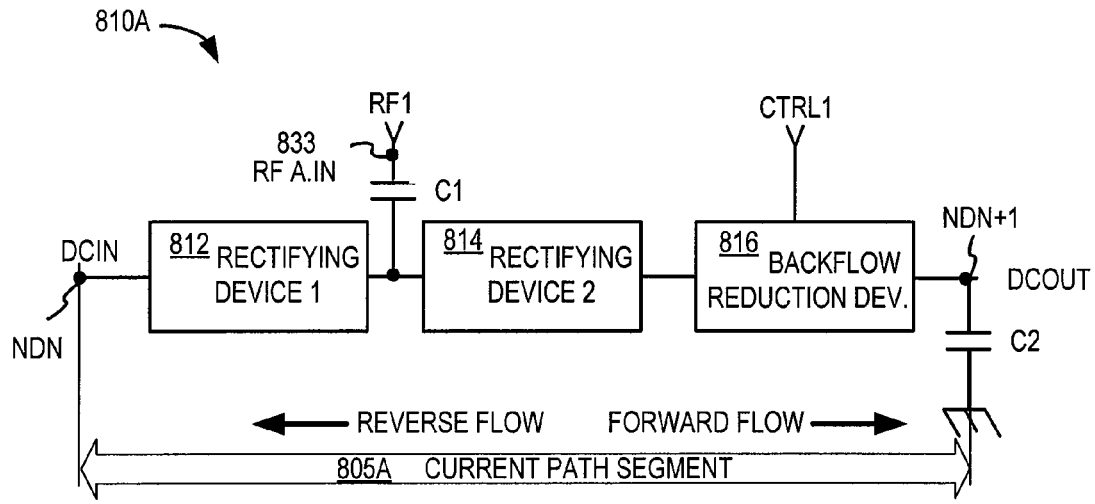
FIG. 8A is a block diagram illustrating a rectifier stage with backflow reduction of the power rectifier of the PMU of FIG. 4 according an embodiment.
Figure 8B:
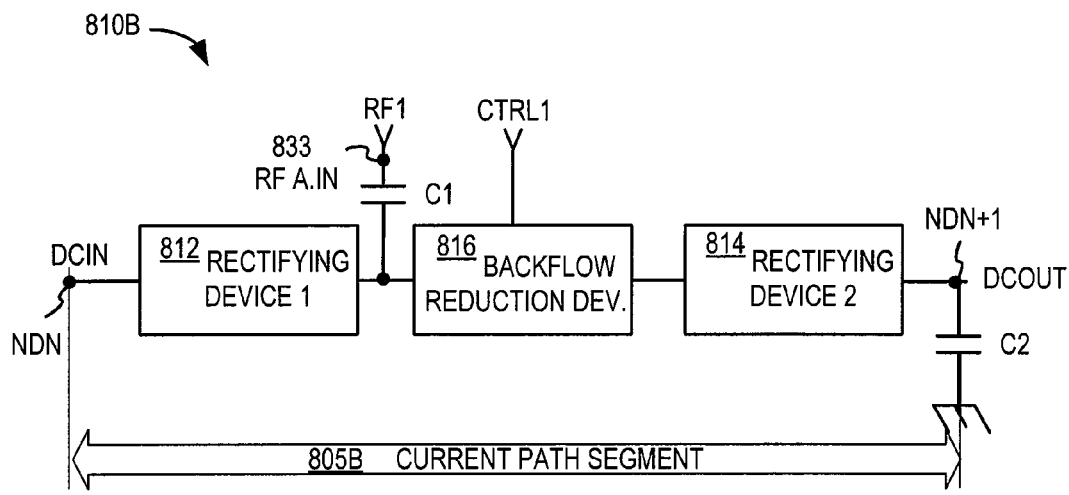
FIG. 8B is a block diagram illustrating a rectifier stage with backflow reduction of the power rectifier of FIG. 4 according to another embodiment.

FIGS. 8A and 8B are block diagrams that illustrate RF rectifier stages 810A and 810B with backflow reduction of the power rectifier of the PMU of FIG. 4 according to embodiments. Rectifier stages 810A and 810B are designed to provide positive output voltage DCOUT. Current flow direction "forward flow" means that the received charge is pumped along segment 805 from a low potential node toward a higher potential node.

Rectifier stage 810A includes rectifying device 1 812, rectifying device 2 814 and backflow reduction device 816. Rectifying device 1 812, rectifying device 2 814 and backflow reduction device 816 are coupled serially to form rectifier stage 810A. The serially coupled rectifying device 1 812, rectifying device 2 814 and backflow reduction device 816 define segment 805A of the main current path. Capacitor C2 couples an output terminal of backflow reduction device 816 to ground.

An input terminal of rectifying device 1 812 is coupled to node NDN to receive a DC input DCIN, an output terminal of rectifying device 1 812 is coupled to RF antenna input RF A.IN 833 to receive RF signal RF1. An input terminal of rectifying device 2 814 is coupled to the output terminal of rectifying device 1 812. An input terminal of backflow reduction device 816 is coupled an output terminal of rectifying device 2 814. An output terminal of backflow reduction device 816 is coupled to output terminal NDN+1 of rectifier stage 810 to provide a DC output DCOUT, while a control terminal of backflow reduction device 816 is coupled to receive a backflow control signal CTRL1.

Backflow reduction device 816 is operated to reduce the flow of the received charge in a reverse direction in current path segment 805A. This can be done in any number of ways. One such way is to substantially disconnect and reconnect current path segment 805A in response to backflow control signal CTRL1.

Rectifier stage 810B includes rectifying device 1 812, backflow reduction device 816, and rectifying device 2 814. Rectifying device 1 812, backflow reduction device 816, rectifying device 2 814 are coupled serially to form rectifier stage 810B. The serially coupled rectifying device 1 812, backflow reduction device 816, and rectifying device 2 814 define segment 805B of the main current path. Capacitor C2 couples an output terminal of rectifying device 2 814 to ground.

The input terminal of rectifying device 1 812 is coupled to node NDN to receive DC input DCIN, the output terminal of rectifying device 1 812 is coupled to RF antenna input RF A.IN 833 to receive the RF signal. The input terminal of backflow reduction device 816 is coupled to the output terminal of rectifying device 1 812, while the control terminal of backflow reduction device 816 is coupled to receive backflow control signal CTRL1. An input terminal of rectifying device 2 814 is coupled to the output terminal of backflow reduction device 816. The output terminal of rectifying device 2 814 is coupled to output terminal NDN+1 of rectifier stage 810B to provide a DC output DCOUT.

Rectifying device 1 812 and rectifying device 2 812 can be formed from bipolar diodes, FET diodes, bipolar transistors and FET transistors or combinations of them. Backflow reduction device can be formed from any suitable switching device, e.g., bipolar or FET transistors.

It should be obvious that rectifier stages similar to rectifier stages 810A and 810B can constructed to provide negative output voltage DCOUT. In such rectifiers, the direction forward flow should be interpreted as such that charges are moved from a high potential node toward a low potential node.

A difference between FIG. 8A and FIG. 8B is in the placement of backflow reduction device 816, with respect to first rectifying device 812 and second rectifying device 814. It will be apparent to a person skilled in the art that backflow reduction device 816 could be also placed to the left of first rectifying device 812 and second rectifying device 814.

Figure 8C:
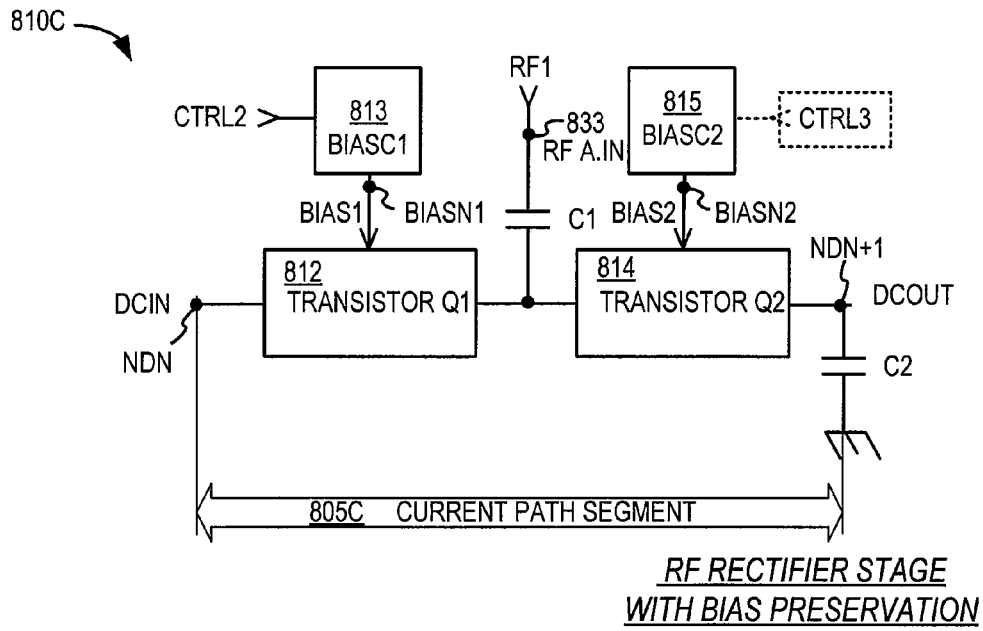
FIG. 8C is a block diagram illustrating a rectifier stage with bias preservation of the power rectifier of the PMU of FIG. 4 according to embodiments.

FIG. 8C is a block diagram that illustrates RF rectifier stage 810C with bias preservation of the power rectifier of the PMU of FIG. 4 according to embodiments. Preserving the integrity of bias voltages is desired, in order to maintain/enhance efficiency of the RF rectifier stage.

During a modulation phase of RF tag circuit 120 of FIG. 1 bias voltages can become corrupted, i.e. their value can change, which requires re-biasing. Re-biasing takes time, which indirectly results a loss of power. Re-biasing time can be eliminated by saving a desired bias voltages during regular operations (the RF signal is high) and re-introducing them upon the return of the RF signal.

Rectifier stage 810C includes current pass segment 805C, bias circuit 813, and bias circuit 815. Transistor Q1 812 and transistor Q2 814 are coupled serially. The serially coupled transistors define a current path segment 805C. Capacitor C2 couples an output terminal of transistor Q2 814 to ground.

An input terminal of transistor Q1 812 is coupled to node NDN to receive DC input DCIN, an output terminal of transistor Q1 812 is coupled to RF antenna input RF A.IN 833 to receive RF signal RF1. A control terminal of transistor Q1 is coupled to bias circuit 813 at node BIASN1 to receive first bias voltage BIAS1, an input terminal of transistor Q2 814 is coupled to the output terminal of transistor Q1 812. An output terminal of transistor Q2 814 is coupled to output terminal NDN+1 of rectifier stage 810C to provide DC output DCOUT. A control terminal of transistor Q2 814 is coupled to bias circuit 815 at node BIASN2 to receive second bias voltage BIAS2. Bias voltages BIAS1 and BIAS2, for the most part, are DC voltages. They can optionally also include AC components. Bias preservation control signals CTRL2 and CTRL3 direct the operation of bias control circuit 813 and bias control circuit 815, respectively.

Figure 8D:
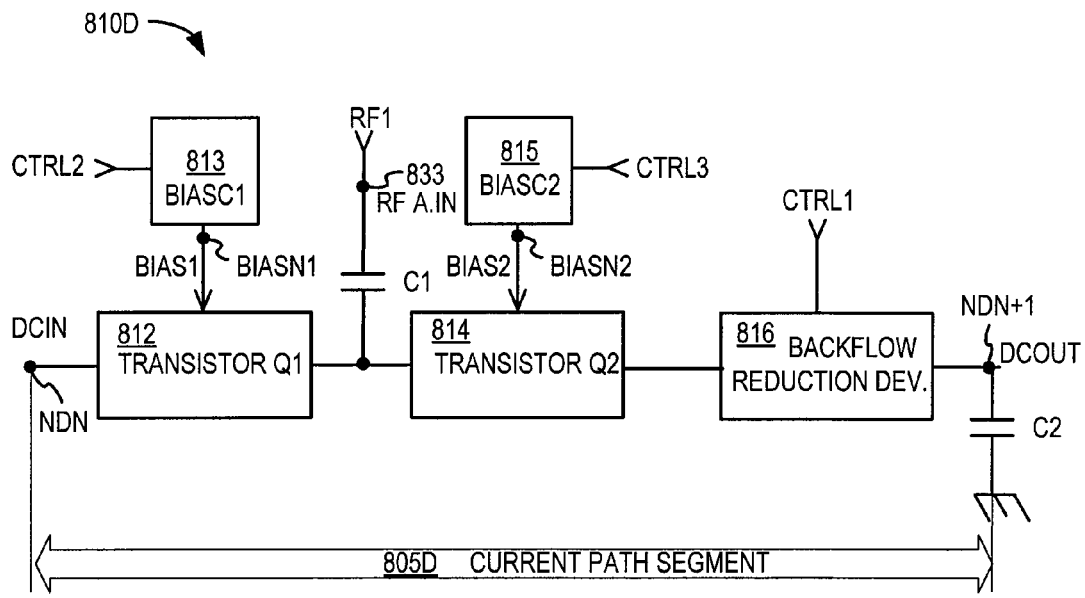
FIG. 8D is a block diagram illustrating a rectifier stage with backflow reduction and bias preservation of the power rectifier of the PMU of FIG. 4 according to embodiments.

FIG. 8D is a block diagram that illustrates RF rectifier stage 810D with backflow reduction and bias preservation of the power rectifier of the PMU of FIG. 4 according to embodiments. RF rectifier stage 810D is a combination of RF rectifier stage 810A of FIG. 8A and RF rectifier stage 810C of FIG. 8C. RF rectifier stage 810D is capable of reducing backward current flow and preserving bias voltages. RF rectifier stage 810D is shown to utilize only one backflow reduction device, it should be obvious that additional backflow reduction device can be employed in segment 805D between transistor Q1 812 and transistor Q2 814.

Figure 9:
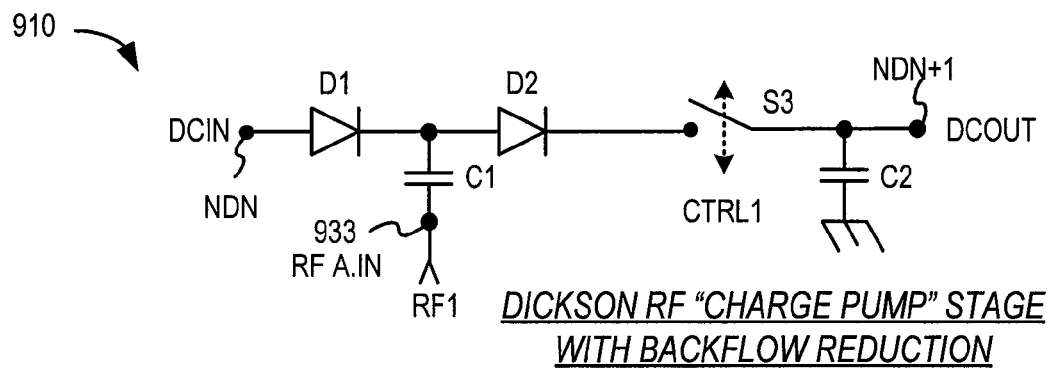
FIG. 9 is a schematic diagram of a Dickson RF "Charge-pump" stage with backflow reduction in a main current path according to an embodiment.

FIG. 9 is a schematic diagram of Dickson RF "Chargepump" stage 910 with backflow reduction according to an embodiment. Operation of stage 910 fundamentally follows the operation of stage 600 of FIG. 6. An insertion of switch S3 in the main current path prevents stage N and stage N+1 from sharing charge during the modulation phase. When the RF signal RF1 is interrupted, a stage with voltage higher than a neighboring stage can leak a backflow current toward the low voltage node. This backflow current results in loss of power into chip ground. Switch S3, under the direction of backflow reduction signal CTRL1, can break the current path and by doing so can reduce the power loss.

Figure 10:
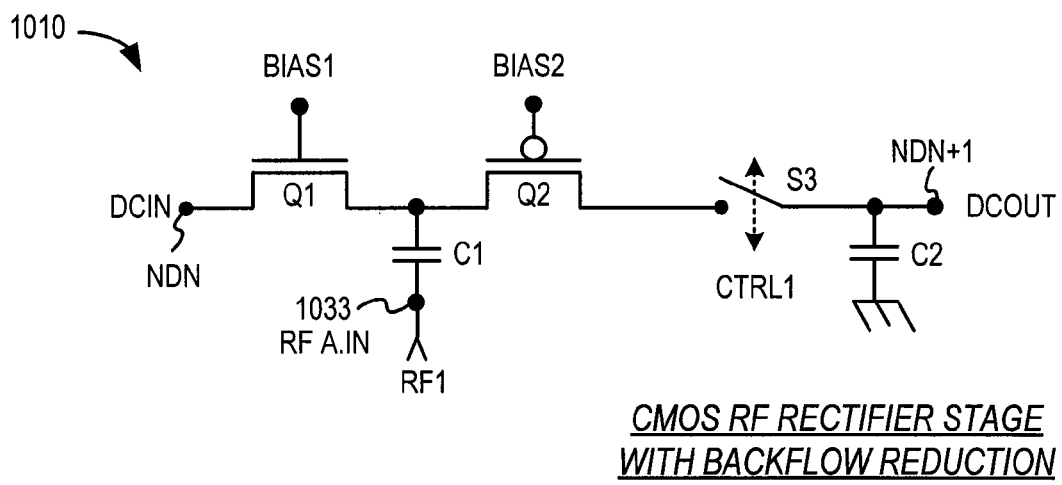
FIG. 10 is a schematic diagram of a CMOS RF rectifier stage with backflow reduction in a main current path according to an embodiment.

FIG. 10 is a schematic diagram of a CMOS RF rectifier stage 1010 with backflow reduction in the segment of the main current path according to an embodiment. The operation of stage 1010 fundamentally follows the operation of stage 700 of FIG. 7. Insertion of switch S3 in the segment of the main current path prevents stage N+1 and stage N from sharing charge during the modulation phase. When the RF signal RF1 is interrupted, a stage with voltage higher than a neighboring stage can leak a backflow current toward the low voltage node. This backflow current results in loss of power into chip ground. Switch S3, under the direction of backflow reduction signal CTRL1 can break the main power path and by doing so prevents power loss.

Figure 11:
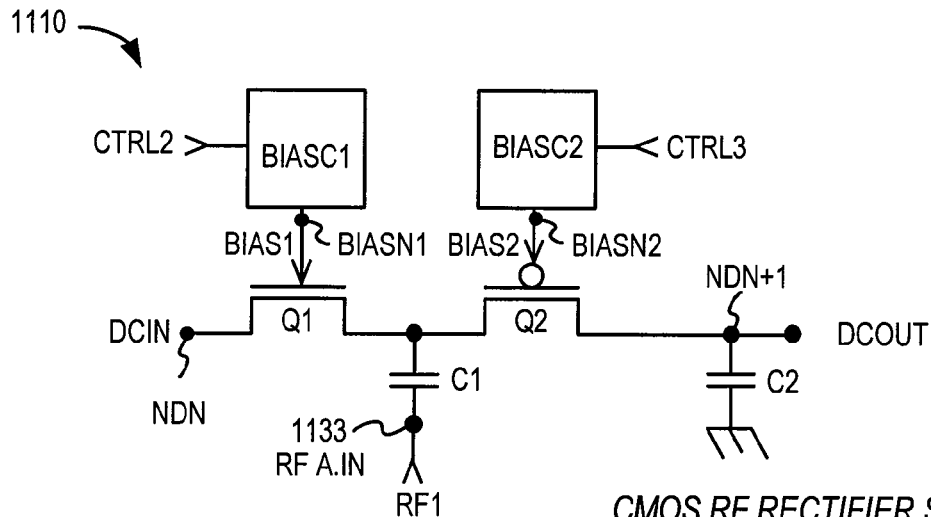
FIG. 11 is a schematic diagram of a CMOS RF rectifier stage with bias preservation according to an embodiment.

FIG. 11 is a simplified schematic diagram that shows components of CMOS RF rectifier stage 1110 with bias preservation of the power rectifier of the PMU of FIG. 4 according to an embodiment. CMOS RF rectifier stage 1110 includes nFET Q1, pFET Q2. nFET Q1 and pFET Q2 that are coupled serially to form rectifier stage 1110. Capacitor C2 couples an output terminal of pFET Q2 to ground.

An input terminal of nFET Q1 is coupled to node NDN to receive a DC input DCIN, an output terminal of nFET Q1 is coupled to RF antenna input RF A.IN to receive the RF signal RF1. A gate of nFET Q1 is coupled to bias circuit BIASC1 at node BIASN1 to receive first bias voltage BIAS1. An input terminal of pFET Q2 is coupled to the output terminal of nFET Q1. The output terminal of pFET Q2 is coupled to output terminal NDN+1 of rectifier stage 1110 to provide a DC output DCOUT. A gate of pFET Q2 is coupled to bias circuit BIASC2 at node BIASN2 to receive second bias voltage BIAS2. Bias preservation control signals CTRL2 and CTRL3 direct the operation of bias control circuit BIASC1 and bias control circuit BIASC2, respectively.

Figure 12:
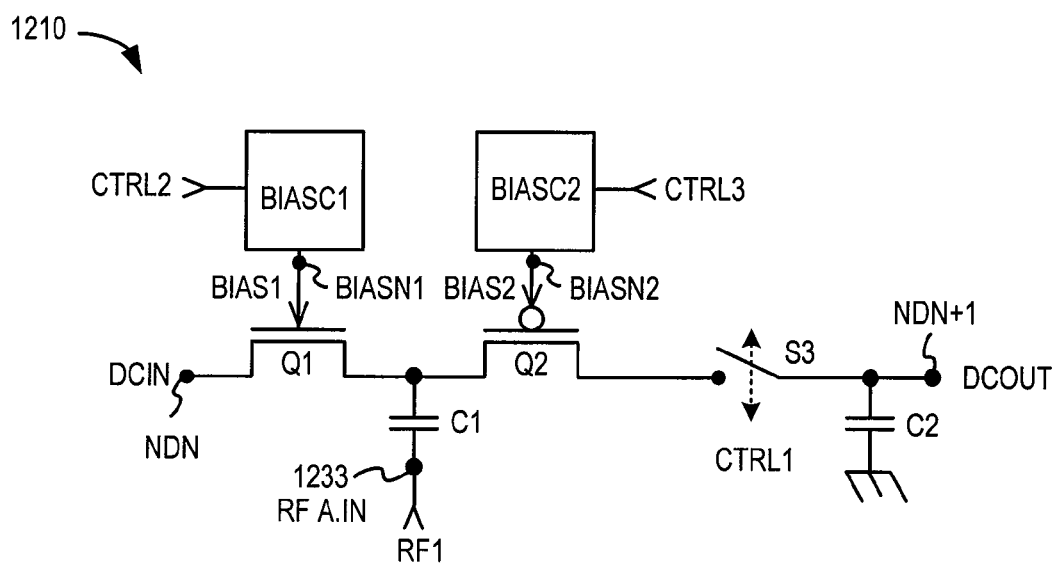
FIG. 12 is a schematic diagram of a CMOS RF rectifier stage with backflow reduction in the main current path, and bias preservation according to an embodiment.

FIG. 12 is a simplified schematic diagram that shows components of CMOS RF CMOS RF rectifier stage 1210 with bias preservation and backflow reduction in the segment of the main current path and of the power rectifier of the PMU of FIG. 4 according to an embodiment.

CMOS RF rectifier stage 1210 is a combination of CMOS RF rectifier stage 1010 of FIG. 10 and CMOS RF rectifier stage 1110 of FIG. 11. CMOS RF rectifier stage 1210 inherits both backflow reduction and bias preservation characteristics of the above mentioned rectifier stages.

Figure 13:
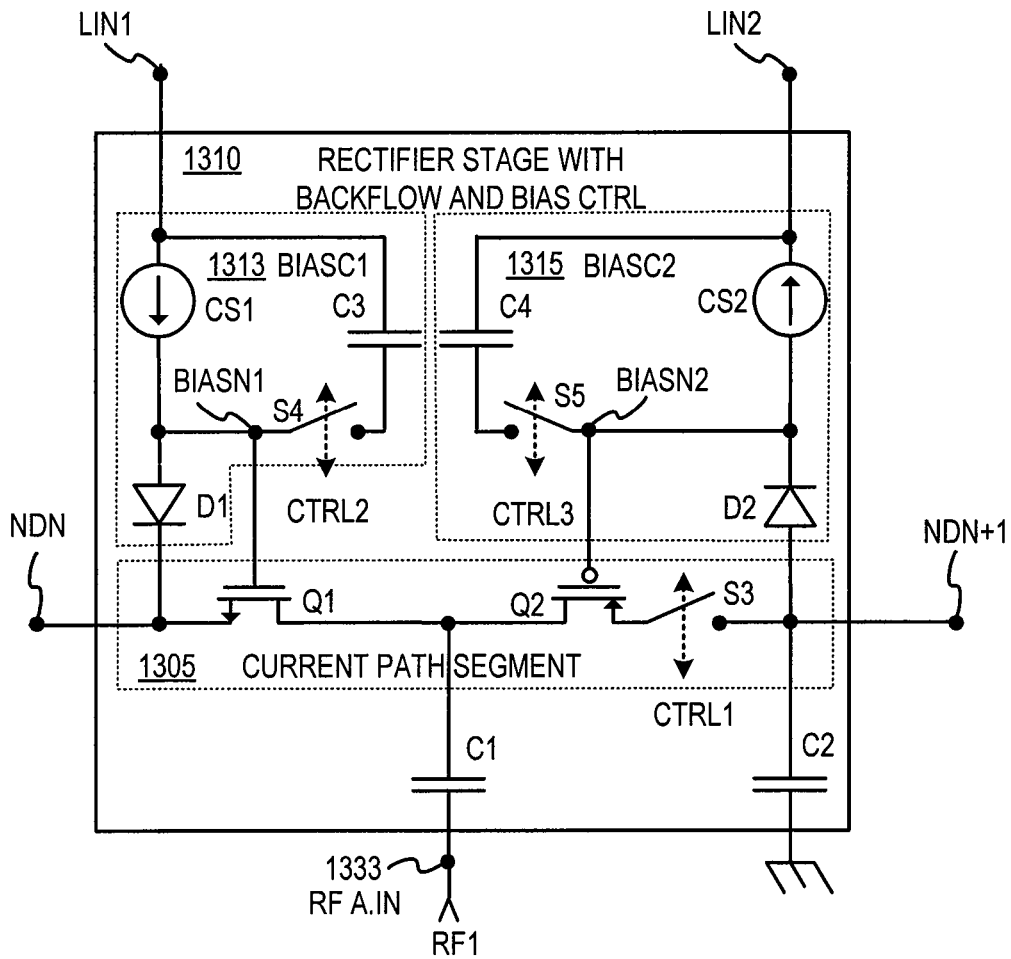
FIG. 13 is a schematic diagram of a CMOS RF rectifier stage with backflow reduction in the main current path, and bias preservation according to an embodiment.

FIG. 13 is a schematic diagram of CMOS RF Rectifier stage 1310 with bias preservation and backflow reduction in the segment of the main current path according to an embodiment. Schematic diagram of FIG. 13 illustrates some of the implementation details of CMOS RF Rectifier stage 1310. CMOS RF Rectifier stage 1310 includes current path segment 1305, bias circuit1 1313, bias circuit2 1315, capacitors C1, C2 and RF antenna input terminal 1333. Current path segment 1305 is formed by the serially coupled FETs Q1, Q2, and backflow reduction switch S3. Bias circuit1 1313 includes current source CS1, diode D1, capacitor C3, and bias preservation switch S4, which is controlled by bias preservation control signal CTRL2. Bias circuit2 1315 includes current source CS2, diode D2, capacitor C4, and bias preservation switch S5, which is controlled by bias preservation control signal CTRL3.

Diodes D1 and D2 may also be implemented as transistors configured as diodes. In that case, diode D1 may be made with similar characteristics as those of transistor Q1, and diode D2 may be made with similar characteristics as those of transistor Q2.

Structure and operation of current path segment 1305 follow stage 1010 of FIG. 10. Backflow reduction control switch S3 in the segment prevents stage N+1 and stage N from sharing charge during modulation. Switch S3, under the direction of backflow reduction signal CTRL1 can substantially break the main power path and doing so prevents power loss.

Bias circuit 1313 provides a substantially constant bias voltage BIAS1 for nFET Q1 at a time when RF signal RF1 at antenna input RF A.IN 1333 is at a regular strength, during this time bias preservation control signal CTRL2 is asserted to turn on switch S4 allowing capacitor C3 to be charged to a predetermined bias voltage BIAS1. When no RF signal is available bias voltage BIAS1 could deteriorate due to current leakages. To prevent this bias voltage deterioration, preservation control signal CTRL2 turns off switch S4 preserving bias voltage BIAS1 on capacitor C3. Once the RF signal returns to the regular strength, bias preservation control signal CTRL2 turns on switch S4 allowing capacitor C3 to provide bias voltage BIAS1 at the predetermined level for nFET1, without needing to wait for bias voltage BIAS1 to be "rebuilt".

Bias circuit BIASC2 provides substantially constant bias voltage BIAS2 for pFET Q2. Bias circuit BIASC2 operates the same way as bias circuit BIASC1 does. Bias preservation control signal CTRL3 can be different from bias preservation control signal CTRL2 or in some implementations, the two control signals can be the same.

Bias preservation switches S4 and S5 can be formed from any suitable switching device, e.g., bipolar or FET transistors.

Figure 14:
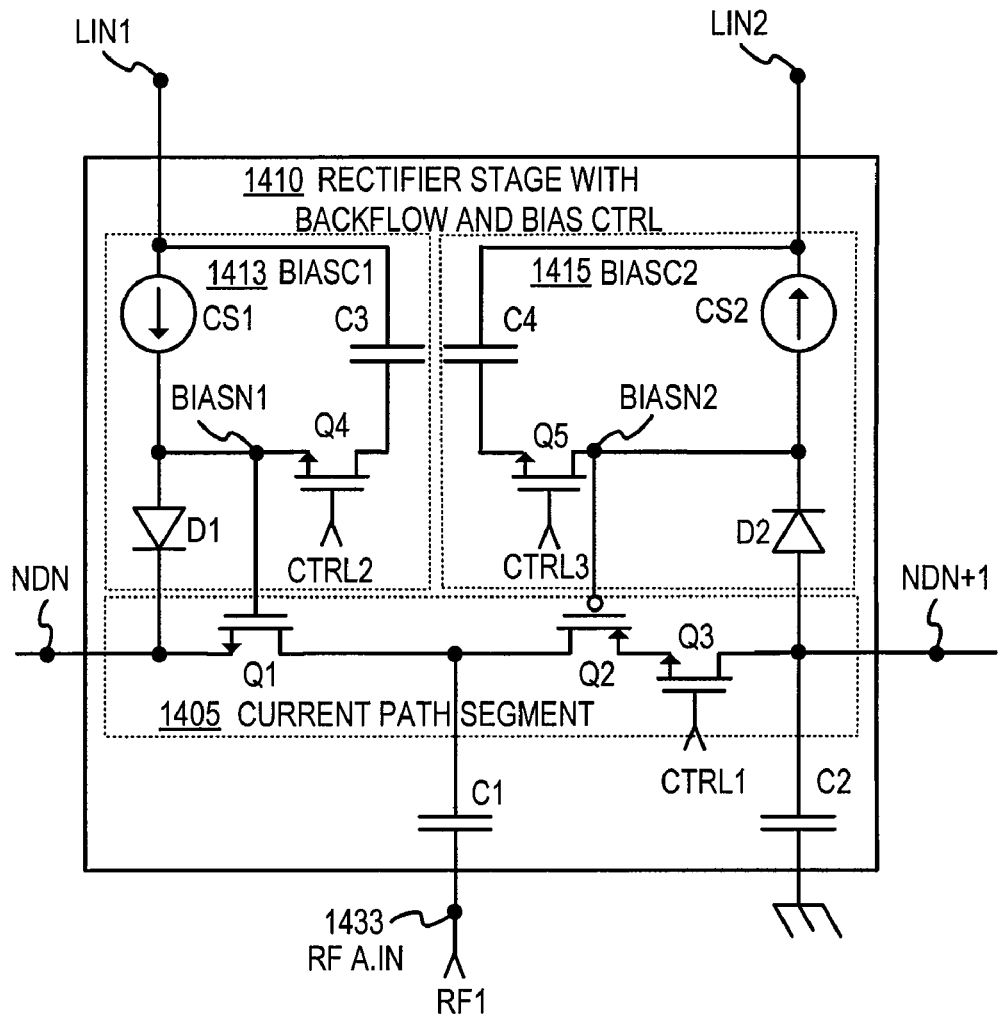
FIG. 14 is a detailed schematic diagram of a CMOS RF rectifier stage with backflow reduction in the main current path, and bias preservation according to an embodiment.

FIG. 14 is a detailed schematic diagram of CMOS RF rectifier stage 1410 with bias preservation and backflow reduction in the segment of the main current path according to an embodiment. CMOS RF Rectifier stage 1410 includes current path segment 1405, bias circuit1 1413, bias circuit2 1415, capacitors C1, C2 and RF antenna input terminal 1433. Current path segment 1405 is formed by serially coupled nFETs Q1, pFET Q2, and backflow reduction nFET Q3. Bias circuit1 1413 includes current source CS1, diode D1, capacitor C3, and bias preservation nFET Q4. Bias preservation nFET Q4 operated by bias preservation control signal CTRL2. Bias circuit2 1415 includes current source CS2, diode D2, capacitor C4, and bias preservation nFET q5, Bias preservation nFET Q5 operated by bias preservation control signal CTRL3.

A first terminal of current source CS1 and one of the terminals of capacitor C3 is coupled to low impedance node LIN1. A second terminal of current source CS1 is coupled to a gate of nFETs Q1, an anode of diode D1, and a source of bias preservation nFET Q4.

A cathode diode D1 is coupled to a source of nFET Q1.

A drain of bias preservation nFET Q4 is coupled to the other terminal of capacitor C3, while its gate is coupled to receive bias preservation control signal CTRL2.

A first terminal of current source CS2 and one of the terminals of capacitor C4 is coupled to low impedance node LIN2. A second terminal of current source CS2 is coupled to a gate of pFETs Q2, an anode of diode D2, and a source of bias preservation nFET Q5.

A cathode diode D2 is coupled to a drain of pFET Q2.

A drain of bias preservation nFET Q5 is coupled to the other terminal of capacitor C4, while its gate is coupled to receive bias preservation control signal CTRL3.

The source nFETs Q1 is coupled to input node NDN, its drain is coupled via capacitor C1 to RF antenna input node 1433 to receive RF signal RF1.

A drain of pFET Q2 is coupled to the drain of nFET Q1 its source is coupled to a source of backflow reduction nFET Q3.

A gate of backflow reduction nFET Q3 is coupled to receive backflow reduction control signal CTRL1, and its drain is coupled to output node NDN+1.

Capacitor C2 is coupled between output node NDN+1 and ground.

Figure 15:
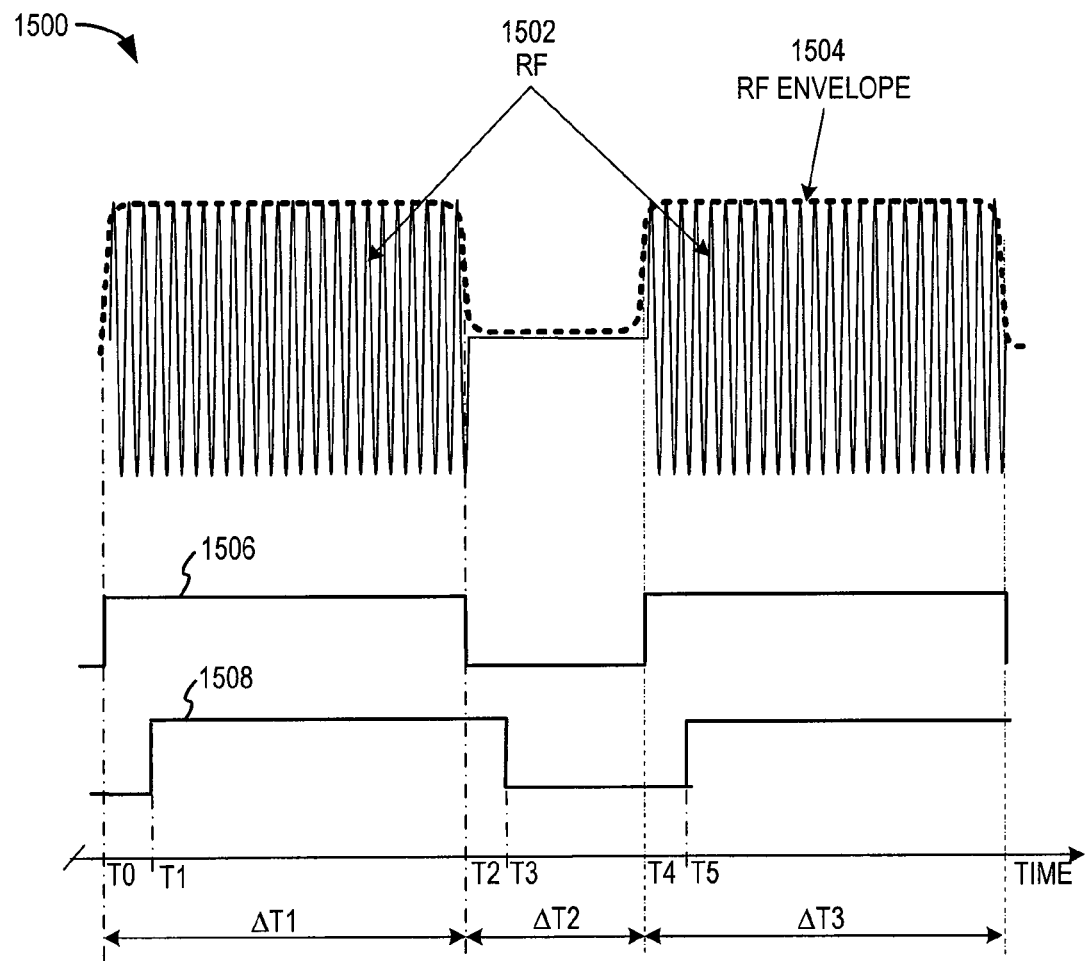
FIG. 15 is a diagram showing some possible control signals that are derived from the modulator of FIG. 3.

FIG. 15 is diagram 1500 that shows some possible control signals derived from modulator 346 of FIG. 3. Waveform 1502 illustrates the RF signal RF1 at RF antenna input node RF A.IN. Waveform 1504 represents an RF signal envelope. Time-intervals ΔT1 and ΔT3 are times when RF signal RF1 is available at a strength that allows power rectifier 543 of FIG. 5 to operate normally. During time-interval ΔT2 there is less RF radiation available. Waveform 1506 represents an idealized RF signal envelope. Waveform 1508 represents a control signal that can derived from modulator 346 of FIG. 3. Control signal represented by waveform 1508 can be used as any one of the control signals CTRL1, CTRL2, and CTRL3 of FIG. 14. For example, when control signal 1508 is used as bias preservation control signal CTRL2, it turns on transistor Q4 at time T1, allowing capacitor C3 to be charged to bias voltage BIAS1. At time T2, RF signal RF1 becomes unavailable, shortly after that at time T3, bias preservation control signal CTRL2 turns off transistor Q4 storing bias voltage BIAS1. At time T4, RF signal RF1 returns, shortly after that at time T5, bias preservation control signal CTRL2 turns on transistor Q4 connecting capacitor C3 to node BIASN1 to provide bias voltage BIAS1 for Q1. It should be noted that the depicted time scale and timing relationships are for illustrative purpose only.

Figure 16:
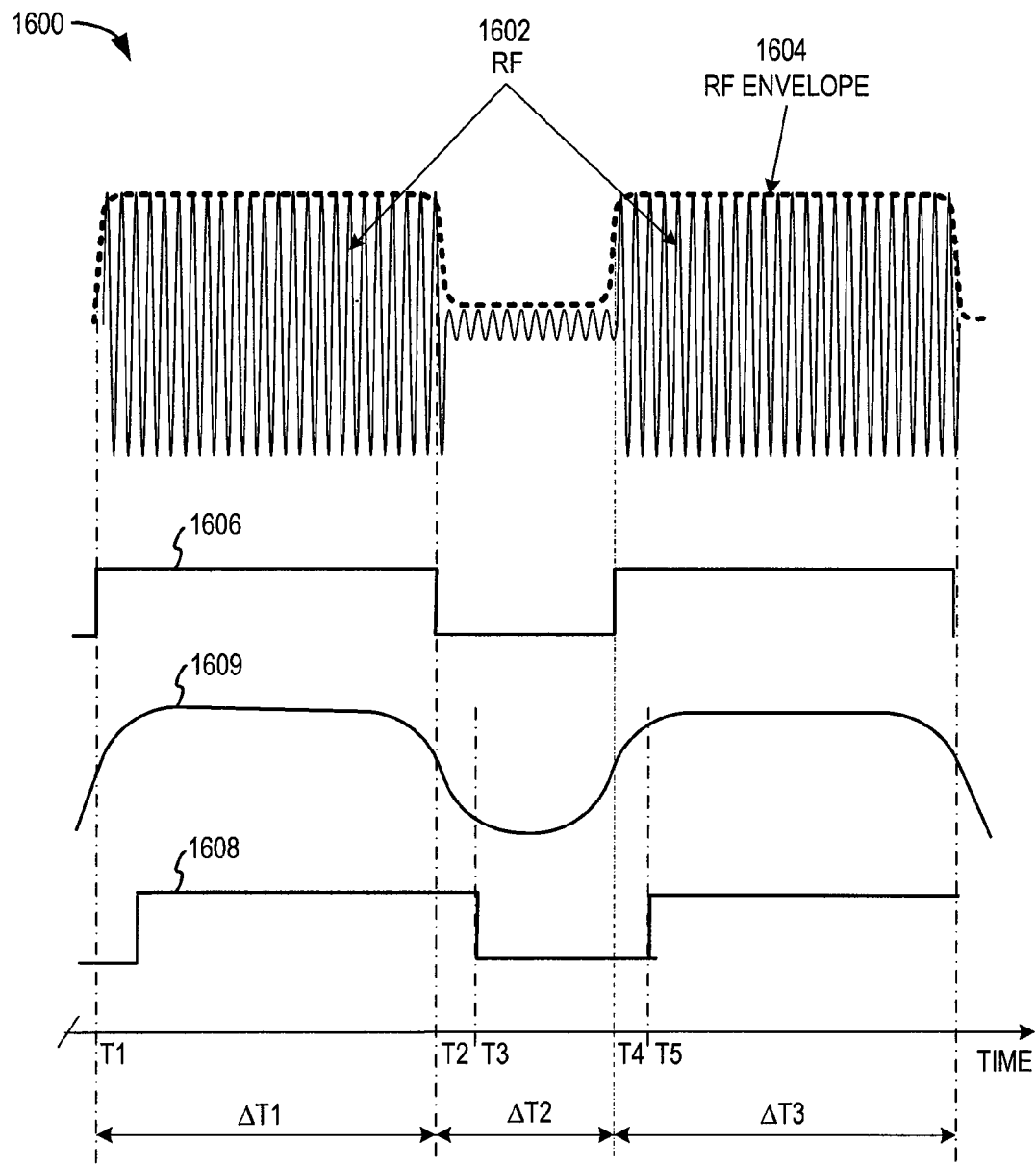
FIG. 16 is a diagram showing some possible control signals that are derived from the demodulator of FIG. 3.

FIG. 16 is diagram 1600 that shows some of the possible control signals, which can be derived from the demodulator 342 of FIG. 3. Waveform 1602 illustrates the RF signal RF1 at RF antenna input node RF A.IN. Waveform 1604 represents an RF signal envelope. Waveform 1606 represents an idealized RF signal envelope. Waveform 1609 represents an actual analog RF signal envelope as generated by an envelope detector of demodulator 342 of FIG. 3. Waveform 1608 represents a control signal that is derived from analog signal 1609. Control signal represented by waveform 1608 can be used as any one of the control signals CTRL1, CTRL2, and CTRL3 of FIG. 14. For example using control signal 1608 as backflow reduction signal CTRL1, a backflow reduction operates as follows. At time T2, RF signal RF1 becomes unavailable, shortly after that T3, backflow control signal CTRL1 turns off backflow reduction device, substantially disconnecting the main current path. At time T4, RF signal RF1 returns, shortly after that T5, backflow reduction device Q3 is turned on reconnecting the main current path.

Suitable control signals other than the ones mentioned above can be derived from processing block 344 of the RFID tag 324 of FIG. 3.

Although it is not obvious from FIGS. 15 and 16, it should be noted that control signal CTRL1, CTRL2, and CTRL3 are non-periodic signals and their frequency of change is at least two orders of magnitude lower than the frequency of the RF signal.

Numerous details have been set forth in this description, which is to be taken as a whole, to provide a more thorough understanding of the invention. In other instances, well-known features have not been described in detail, so as to not obscure unnecessarily the invention.

The invention includes combinations and subcombinations of the various elements, features, functions, and/or properties disclosed herein. The following claims define certain combinations and subcombinations, which are regarded as novel and non-obvious. Additional claims for other combinations and subcombinations of features, functions, elements, and/or properties may be presented in this or a related document.

The invention claimed is:

1. A rectifier for an RFID tag circuit, comprising:
   an antenna input node configured to receive an alternating signal; and
   a plurality of serially coupled stages defining a main current path, at least one of the stages including:
   a segment of the main current path, the segment including a first rectifying device, a second rectifying device, and
   a backflow reduction device for substantially disconnecting and reconnecting the segment less frequently than a frequency of the alternating signal.

2. The rectifier of claim 1, in which
   all the stages are made identically to each other.

3. The rectifier of claim 1, in which
   not all the stages are made identically to each other.

4. The rectifier of claim 1, in which
   one of the first rectifying device and the second rectifying device is one of a diode, a FET, and a bipolar transistor.

5. The rectifier of claim 1, in which
   the backflow reduction device is one of a FET and a bipolar transistor.

6. The rectifier of claim 1, in which
   the second rectifying device is between the first rectifying device and the backflow reduction device within the segment.

7. The rectifier of claim 1, in which
   the backflow reduction device is between the first rectifying device and the second rectifying device within the segment.

8. The rectifier of claim 1, in which
   the first and the second rectifying devices are configured such that the received charge is pumped in a first direction along the segment, and
   the backflow reduction device is operated so as to reduce how much of the received charge is discharged in a reverse direction along the segment that is opposite to the first direction.

9. The rectifier of claim 1, in which
   the backflow reduction device substantially disconnects and reconnects the current path responsive to a backflow control signal generated by the tag circuit.

10. The rectifier of claim 9, in which
    the backflow control signal is derived from a control signal source of the tag circuit.

11. The rectifier of claim 9, in which
    the backflow control signal is derived from a demodulator of the tag circuit.

12. The rectifier of claim 11, in which
    the backflow control signal is derived from an envelope detection circuit of the demodulator.

13. The rectifier of claim 9, in which
    the backflow control signal is derived from a modulator of the tag circuit.

14. The rectifier of claim 9, in which
    the backflow control signal is derived from a processing block in the tag circuit.

15. A rectifier for an RFID tag circuit, comprising:
    an antenna input node configured to receive an alternating signal; and
    a plurality of serially coupled stages defining a main current path, at least one of the stages including:
    a segment of the main current path that includes a first and a second transistor, at least one of the first and the second transistors being configured to receive a first bias voltage, and
    a first bias circuit to supply the first bias voltage, the first bias voltage having a value responsive to a variable first bias preservation control signal that changes in value less frequently than a frequency of the alternating signal.

16. The rectifier of claim 15, in which
    the first bias circuit and the first bias preservation control signal are such that the first bias voltage restored by the first preservation control signal to a value substantially equal to the previous value.

17. The rectifier of claim 15, in which
    the first bias circuit includes
    a first capacitor to store the first bias voltage, and
    a first switch controlled by the first bias preservation control signal to connect and to disconnect the capacitor from a first bias node.

18. The rectifier of claim 17, in which
    the first switch is one of a FET, and a bipolar transistor.

19. The rectifier of claim 17, in which
    the first switch is a FET.

20. The rectifier of claim 17, in which
    the first capacitor is connected to the first bias node when a value of the first bias preservation control signal is sufficient to turn on the first switch.

21. The rectifier of claim 20, in which
    the first bias voltage remains substantially constant while the first switch is on.

22. The rectifier of claim 15, in which
    an output of the first transistor is received by an input of the second transistor, and
    the first bias voltage is received by the first transistor.

23. The rectifier of claim 15, in which
    an output of the first transistor is received by an input of the second transistor, and
    the first bias voltage is received by the second transistor.

* * * * *

UNITED STATES PATENT AND TRADEMARK OFFICE
CERTIFICATE OF CORRECTION

PATENT NO. : 7,768,406 B1  
APPLICATION NO. : 12/145284  
DATED : August 3, 2010  
INVENTOR(S) : Peach et al.

Page 1 of 1

It is certified that error appears in the above-identified patent and that said Letters Patent is hereby corrected as shown below:

Title Page; item (57)
1) Please delete "us" in first page, column 2 (abstract), and line 5 and insert -- is --, therefor.

2) Please delete "q5," in column 9, and line 55 and insert -- Q5, --, therefor.

Signed and Sealed this  
Twelfth Day of April, 2011

David J. Kappos  
*Director of the United States Patent and Trademark Office*